United States Patent
Liang et al.

(10) Patent No.: US 10,963,298 B2
(45) Date of Patent: Mar. 30, 2021

(54) METHOD, DEVICE AND COMPUTER-READABLE FOR MANAGING VIRTUAL MACHINES

(71) Applicant: EMC IP Holding Company LLC, Hopkinton, MA (US)

(72) Inventors: Mengjia Liang, Chengdu (CN); Yanhan Pu, Chengdu (CN); Fangbin Zhou, Chengdu (CN)

(73) Assignee: EMC IP Holding Company LLC, Hopkinton, MA (US)

(*) Notice: Subject to any disclaimer, the term of this patent is extended or adjusted under 35 U.S.C. 154(b) by 70 days.

(21) Appl. No.: 16/119,336

(22) Filed: Aug. 31, 2018

(65) Prior Publication Data

US 2019/0324784 A1 Oct. 24, 2019

(30) Foreign Application Priority Data

Apr. 20, 2018 (CN) .......................... 201810361639.0

(51) Int. Cl.
*G06F 9/48* (2006.01)
*G06F 9/54* (2006.01)
*G06F 9/455* (2018.01)
*G06F 9/50* (2006.01)

(52) U.S. Cl.
CPC ........ *G06F 9/4881* (2013.01); *G06F 9/45533* (2013.01); *G06F 9/5005* (2013.01); *G06F 9/542* (2013.01)

(58) Field of Classification Search
CPC .... G06F 9/45533; G06F 9/542; G06F 9/4881; G06F 9/5005
See application file for complete search history.

(56) References Cited

U.S. PATENT DOCUMENTS

| 10,528,627 B1* | 1/2020 | Dunsmore ............ H04L 41/069 |
| 2017/0031701 A1* | 2/2017 | DeLuca .............. G06F 9/45558 |

* cited by examiner

*Primary Examiner* — Jacob D Dascomb
(74) *Attorney, Agent, or Firm* — Chamberlain, Hrdlicka, White, Williams & Aughtry

(57) ABSTRACT

Embodiments of the present disclosure provide a method, device and computer-readable storage medium for managing virtual machines. In accordance with embodiments of the present disclosure, tags in a virtual machine system are selected based on condition information input by a user. The virtual machines are retrieved for the selected tags. In this way, less data is required to be transmitted over the network and less data is required to be processed in order to retrieve specific virtual machines.

12 Claims, 5 Drawing Sheets

METHOD, DEVICE AND COMPUTER-READABLE FOR MANAGING VIRTUAL MACHINES

FIELD

Embodiments of the present disclosure generally relate to virtual machine management, and more specifically, to a method and device for selecting a virtual machine to perform a desired operation.

BACKGROUND

A virtual machine (VM) refers to a complete computer system having complete function of a hardware system by software simulating and running in a totally isolated environment. In virtual machine technology, dynamic policies are used for operations such as discovering and backing up virtual machines. Generally, a rule engine selects the target virtual machine based on one or more properties of the virtual machine to perform the following operation. This approach is typically has a number of inefficiencies.

SUMMARY

In general, embodiments of the present disclosure provide a method, device and computer readable storage medium for managing virtual machines.

In accordance with an aspect of the present disclosure, there is provided a method for managing virtual machines. The method comprises: obtaining a set of tags of virtual machines in a virtual machine system; in response to receiving condition information from a user, obtaining, from the set of tags, a subset of tags associated with the condition information, the condition information indicating a condition associated with an operation desired to be performed by one of the virtual machines; and determining a virtual machine corresponding to at least one tag in the subset of tags so as to perform the desired operation.

In accordance with an aspect of the present disclosure, there is provided a device for managing virtual machines. The device comprises at least one processing unit and at least one memory coupled to the at least one processing unit and storing machine-executable instructions, the instructions, when implemented by the at least one processing unit, causing the device to perform a method. The method comprises: obtaining a set of tags of virtual machines in a virtual machine system; in response to receiving condition information from a user, obtaining, from the set of tags, a subset of tags associated with the condition information, the condition information indicating a condition associated with an operation desired to be performed by one of the virtual machines; and determining a virtual machine corresponding to at least one tag in the subset of tags so as to perform the desired operation.

In accordance with an aspect of the present disclosure, there is provided a computer readable storage medium having computer readable program instructions stored thereon, the computer readable program instructions, when executed by a processing unit, causing the processing unit to implement: obtaining a set of tags of virtual machines in a virtual machine system; in response to receiving condition information from a user, obtaining, from the set of tags, a subset of tags associated with the condition information, the condition information indicating a condition associated with an operation desired to be performed by one of the virtual machines; and determining a virtual machine corresponding to at least one tag in the subset of tags so as to perform the desired operation.

It will be appreciated that through the below description, the present disclosure provides a solution enabling dynamic grouping of virtual machines. The purpose of the present disclosure is to enable dynamic grouping of virtual machines based on the process to improve the efficiency of virtual machine configuration and management.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following detailed description with reference to the accompanying drawings, the above and other objectives, features, and advantages of the present disclosure will become more apparent. In example embodiments of the present disclosure, the same reference signs usually represent the same components.

DETAILED DESCRIPTION OF EMBODIMENTS

Figure 1:
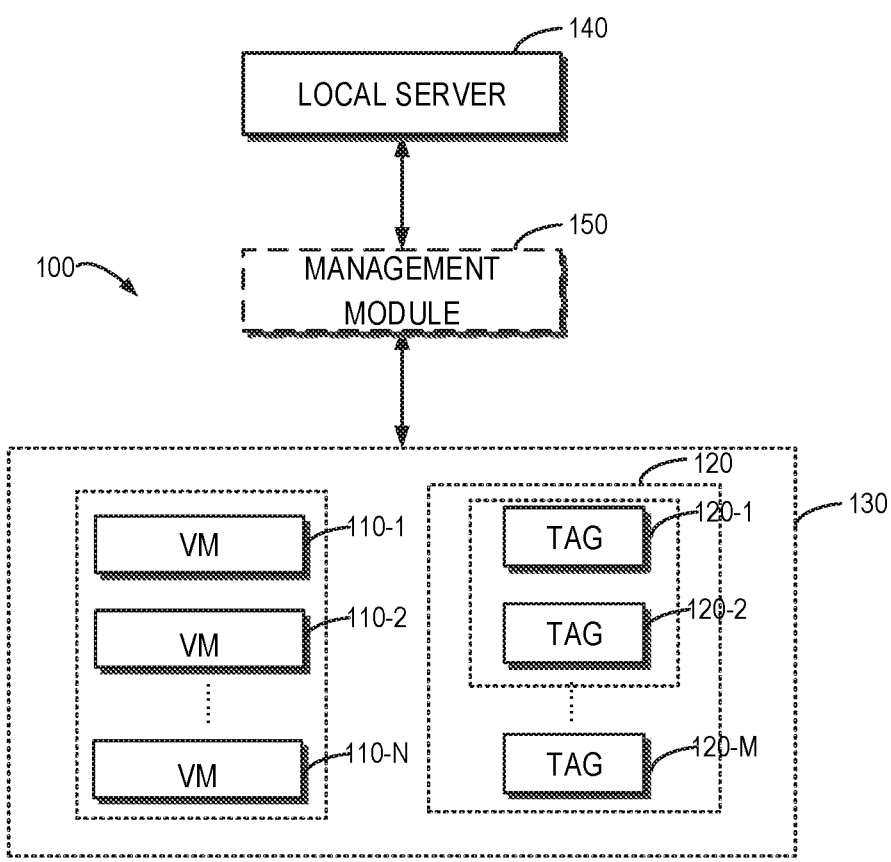
FIG. 1 is a schematic block diagram illustrating a system 100 for managing virtual machines in accordance with embodiments of the present disclosure.

Example embodiments of the present disclosure will be described in the following in greater detail with reference to the drawings. Although example embodiments of the present disclosure are illustrated in the drawings, it is to be understood that the present disclosure can be implemented in various manners, not limited to embodiments illustrated herein. On the contrary, these embodiments are provided to make the present disclosure more thorough and complete and convey the scope of the present disclosure completely to those skilled in the art.

As used herein, the term "include" and its variants are to be read as open-ended terms that mean "includes, but is not limited to." The term "or" is to be read as "and/or" unless the context clearly indicates otherwise. The term "based on" is to be read as "based at least in part on." The terms "an example embodiment" and "an embodiment" are to be read as "at least one example embodiment." The term "another embodiment" is to be read as "at least another embodiment." Terms "first," "second" and the like can denote different or identical objects. The following text may also contain other explicit or implicit definitions.

Conventionally, when a terminal user attempts to perform any specific operation on a batch of target virtual machines in a cloud platform, the terminal user generally needs to find a virtual machine that meets a specific condition. For example, a target virtual machine can be determined based on properties of the virtual machine (such as virtual machine name, folder, and tag and the like). For example, in a conventional dynamic policy, the desired virtual machine may be filtered by rules. To select at least one virtual machine using the dynamic policy, the terminal user first needs to manually find all the virtual machines containing a specified application and configure or add specific virtual machine properties to the virtual machines to group these virtual machines. Then, the terminal user may create a rule to select at least one virtual machine based on specific virtual machine properties.

However, for the terminal user, it is may be difficult and time consuming to manually allocate a large number of virtual machines to one or more groups in a large system because all the virtual machines including the specified application should be filtered and allocated with similar properties. For example, in the conventional dynamic policy, the rule for selecting at least one virtual machine depends on the predefined specific properties of virtual machines. Therefore, before the rule is created, the terminal user has to manually configure the specific properties of virtual machines. Once there are tens of thousands of virtual machines, it is difficult to find all the virtual machines running the specific application and manually configure the specific properties of virtual machine. Under these circumstances, the conventional technologies do not enable a user to efficiently configuration a large number of virtual machines.

One traditional approach to addressing the above problem is to use virtual machine tags. However, the traditional use of virtual machine tags is inefficient. Specifically, the traditional approach requires the retrieval of metadata for each virtual machine on the central server. For example, metadata, such as virtual machine name and folder, may be retrieved by a property collector in batch job. However, because the property collector does not support tags, tag information of the virtual machine has to be retrieved in turn. This approach is rather inefficient and consumes a large quantity of CPU resources and network resources.

The following shows the pseudo codes for a traditional approach for retrieving tags of the virtual machine.

```
ALGORITHM evaluate:
Input:
vc:   VMware vCenter Object
rules: All the rules to evaluate
Output:
The matched VM list
    allVMs <- get all vms from vc
    //step 1: prepare metadata of all the input virtual machines
    FOR each vm in allVMs do
    vm.tag <- rpc_retrieveTagsOnVm
        //prepare metadata ot other virtual machines
    ...
    ENDFOR
    //step 2: run rule engine to obtain a list of matched virtual machines
    RETURN ruleEngine.run(rules,allVMs)
```

As shown above, the retrieval of tags of the virtual machine, requires three remote position control (PRC) calls. In particular, an identifier of the tag for the virtual machine is called based on virtual machine, tag metadata is called based on the identifier of the tag for the virtual machine, and a tag category is called based on an identifier of the tag category. In this case, if there are n virtual machines in the virtual machine system, time to be consumed may be represented by O(n). Although the above method may be optimized by caching the virtual machine tag into the cache area, it still needs to update cache periodically and the time consumed for updating cache each time is still O(n).

To at least in part solve the above and other potential problems, embodiments of the present disclosure provide a solution for managing virtual machine. In this solution, tags in the virtual machine system may be selected based on condition information input by the user and the virtual machine is retrieved from the selected tags. In this way, retrieving metadata of the virtual machine is avoided, thereby reducing consumption of computing resources and network resources.

FIG. 1 is a schematic block diagram illustrating a system 100 for managing virtual machines according to embodiments of the present disclosure. It is to be understood that the structure and function of the system 100 are depicted only for the purpose of illustration without suggesting any limitations to the scope of the present disclosure. Embodiments of the present disclosure may be implemented in different structures and/or functions.

As illustrated in FIG. 1, the system 100 may include: a central server 130, a local server 140 and a management module 150. It may be appreciated that the functional modules included in the system 100 are only examples, and the system 100 may further include any other proper functional modules.

The central server 130 may include virtual machines 110-1, 110-2 . . . 110-N (which may be collectively referred to as "the virtual machine 110," where N is a positive integer). The central server may further include tags 120-1, 120-2 . . . 120-M (which may be collectively referred to as "the tag 120," where M is a positive integer).

The information of the tag may be obtained by the management module 150. For example, the information of the tag may include a category of the tag, a name of the tag and so on. The information of the tag may further include an identifier of the tag, such as a universal unique identifier (UUID). The information of the virtual machine, such as the identifier of the virtual machine, may also be obtained by the management module 150. The local server 140 may also obtain, from the user, condition information to indicate a specific operation performed for a specific virtual machine.

Figure 2:
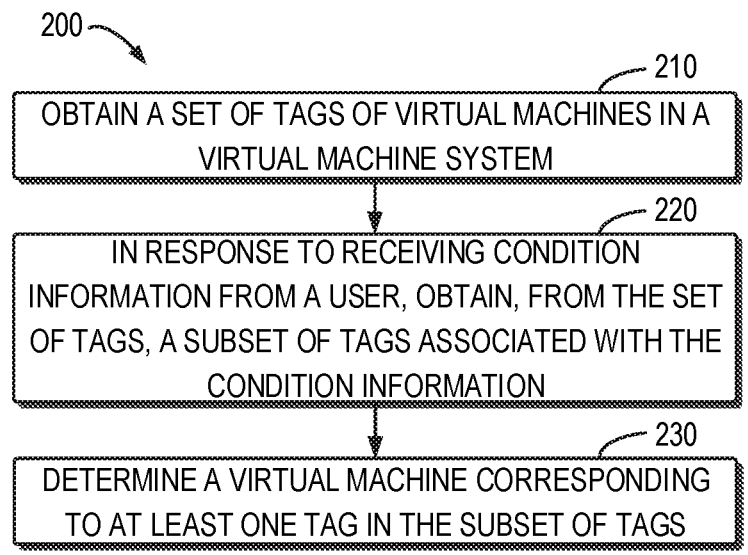
FIG. 2 is a schematic block diagram illustrating a method 200 for managing virtual machines in accordance with embodiments of the present disclosure.

FIG. 2 is a schematic block diagram illustrating a method 200 for managing virtual machines according to embodiments of the present disclosure. For example, the method 200 may be performed by the local server 140 as shown in FIG. 1. It is to be understood that method 200 may further include additional steps not shown and/or omit the illustrated steps. The scope of the present disclosure is not limited in this aspect.

At block 210, the local server 140 obtains a set of virtual machine tags 120 in the virtual machine system. For example, the local server 140 may perform RPC call via an application programming interface (API) to obtain the tag set 120 in the central server 130. In some embodiments, the local server 140 may obtain the information of the tag. For example, the local server may obtain metadata information of the tag.

The local server 140 may perform a remote call for each tag. For example, if there are t tags in total in the central server 130, the local server needs to perform remote calls for t times.

At block 220, the local server 140 receives condition information from the user and obtains a subset of tags associated with condition information in the set of tag 120. For example, the user may specify a specific operation performed for information that meets a specific condition.

Only as an example, the condition information may be represented as the following formula (1):

$$E<\text{LogicOp}>E|<\text{AtomicExp} \quad (1)$$

where E stands for condition information, and LogicOp represents the logic relation between expressions. For example, the logic relation may be AND, OR, NOT, XOR and so on. AtomicExp is a function of metadata of the virtual machine. In some embodiments, it is possible to use the following formula (2) to represent AtomicExp:

$$f(x) = f(T(x)) = \sum_{\forall t \in T(x)} g(t) \quad (2)$$

where x represents a virtual machine (for example, the virtual machines 110-1, 110-2 and on the like), T(x) stands for a set of tags of the virtual machine, and g(t) represents the evaluation function for each tag.

Only as an example, the expression "the virtual machine has a tag 'Sales'" may be represented as the following formula (3):

$$f(x) = f(T(x)) = \sum_{\forall t \in T(x)} eval(t = \text{'Sales'}) \quad (3)$$

The condition information indicates a condition associated with operation desired to be performed by the virtual machine. In some embodiments, the local server 140 may determine whether the tag is matched with the condition information based on the information of the tag and the condition information. For the purpose of explanation and illustration, it is assumed that the condition information is "performing backup operation for the virtual machine with the tag of 'Sales'." The local server 140 evaluates tags in the set of tags 120 to obtain a subset of tags with the tag of 'Sales.' For example, if the tags 120-1 and 120-2 have the 'Sales' tag, then the tags 120-1 and 120-2 may be determined as tags in the subset of tags associated with condition information. The subset of tags associated with condition information may be represented as B(g).

At block 230, the local server 140 determines a virtual machine corresponding to at least one tag in the subset of tags. In some embodiments, the local server 140 may perform remote call via the API to tags (for example, the tags 120-1 and 120-2) in the subset of tags so as to obtain an identifier (such as UUID) of the virtual machine corresponding to the tags in the subset of tags. In some embodiments, it is possible to use a single API call of vSphere automatic software development kit (vSphere Automation SDK) to obtain the identifier of the virtual machine. In this way, the local server 140 does not need to retrieve metadata of each virtual machine in the virtual system, thereby improving the efficiency significantly and saving computing resources.

The virtual machine corresponding to the tags in the subset of tags may be represented as the following formula (4):

$$C(f) = \bigcup_{\forall t \in B(g)} X(t) = \bigcup_{\forall t \in \{t|g(t)=1\}} X(t) \quad (4)$$

where X(t) represents a set of virtual machines including the tag t and C0 represents a set of virtual machines that satisfy the condition information. As stated above, B(g) represents the subset of tags (namely, the matched tag subset) associated with condition information. Therefore, the above formula (1) may be represented as the following formula (5):

$$f(x) = \begin{cases} 1, x \in C(f) \\ 0, \text{otherwise} \end{cases} = \begin{cases} 1, x \in \bigcup_{\forall t \in \{t|g(t)=1\}} X(t) \\ 0, \text{otherwise} \end{cases} \quad (5)$$

In some embodiments, the local server 140 may store the corresponding relationship between the at least one tag and the identifier of the corresponding virtual machine. For example, the local server 140 may cache the identifier of the corresponding virtual machine into the cache area.

The following illustrates the pseudo codes for retrieving the tags of the virtual machine according to embodiments of the present disclosure.

```
ALGORITHM evaluate_v2:
Input:
    vc:                 VMware vCenter Object
    rules:              All the rules to evaluate
Output:
            The matched VM list
    allVMs <- get all vms from vc
//prepare metadata of other virtual machines among all the virtual machines
...
    //step 1: retrieve a set of all the tags
    allTags <- rpc_getAllTags(vc)
    //step 2: look for all lag expressions
    //G2C store mapping from g(t) to C(f)
    G2C <- { }
    FOR EACH ruleA in rules do
        FOR each g in ruleA do
            IF g is tag expression do
                        Put (g,{ }) into G2C
            ENDIF
        ENDFOR
    ENDFOR
    //step 3: evaluate each tag g(t) is all tags to obtain C(g)
    //T2G stere mapping from tag t to g(t)
    T2G <- { }
    FOR EACH t in allTags do
        G <- { }
```

```
        FOR EACH (g,v) in G2V do
            IF g(t) == 1 do
                                   Put g into G
                ENDIF
        ENDFOR
        IF G is not empty do
            Put (t,G) into T2G
        ENDIF
ENDFOR
//step 4: for each tag t in C(g), retrieve X(t) and calculate their combination as V(g)
//T2X store mapping from tag t to the virtual machine ID list
T2X <- rpc__getAttachedVMListByTags(T2G.keys)
FOR EACH (t,G) in T2G do
    Xt <- T2X[t]
    FOR EACH g in G do
        Add Xt to G2V[g]
    ENDFOR
ENDFOR
//step 5. use new expression to replace g to check virtual machine ID FOR EACH (g,V) in G2V do
        replace g with a new expression "vm.id is in V"
ENDFOR
//step 6: run rule engine to obtain a matched virtual machine list
RETURN ruleEngine.run(rules,allVMs)
```

Figure 3:
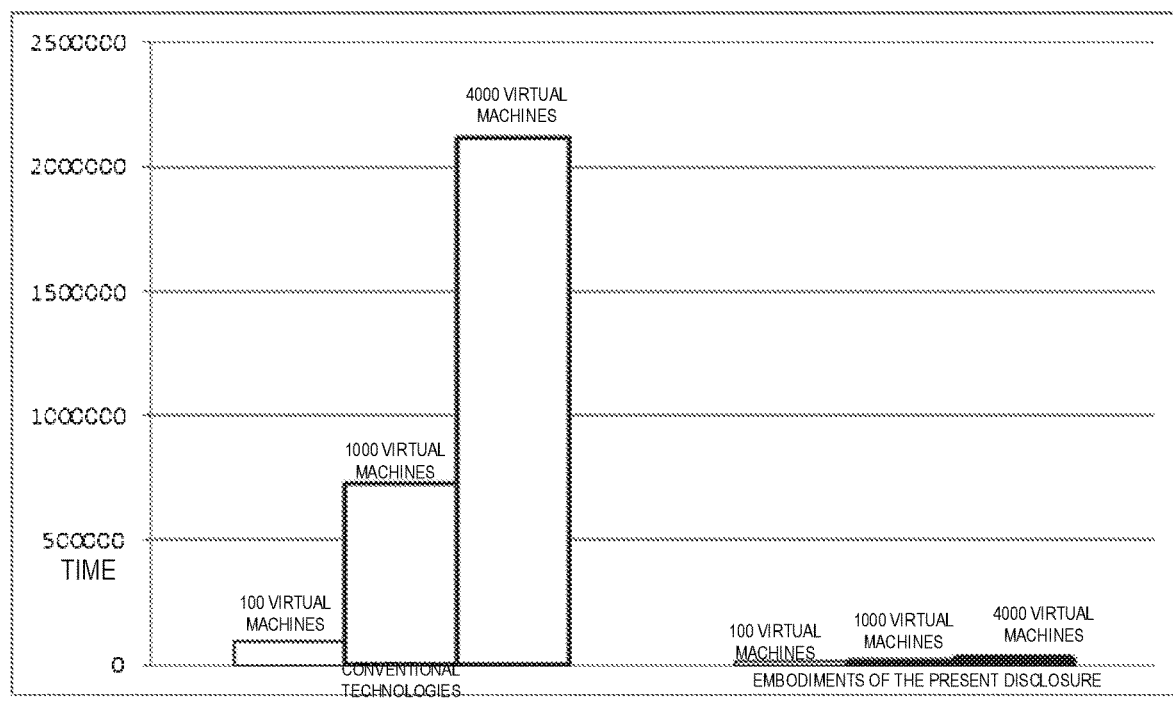
FIG. 3 is a schematic block diagram illustrating a simulation result in accordance with embodiments of the present disclosure.

FIG. 3 is a schematic block diagram illustrating a simulation result according to embodiments of the present disclosure. It can be seen that compared with the conventional technologies, embodiments of the present disclosure significantly shorten the time for looking up target virtual machine. With increasing number of virtual machines, this advantage becomes more and more obvious. According to embodiments of the present disclosure, even though the number of virtual machines increases, the time for looking up the target virtual machine does not increase significantly.

Figure 4:
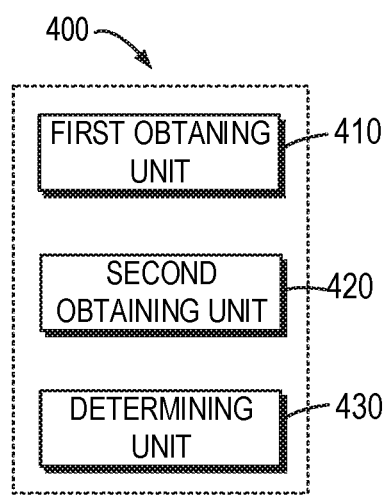
FIG. 4 is a schematic block diagram illustrating an apparatus for managing virtual machines in accordance with embodiments of the present disclosure.

FIG. 4 is a schematic block diagram illustrating an apparatus 400 for data processing in accordance with embodiments of the present disclosure. The apparatus 400, for instance, may be implemented in the system 100 as shown in FIG. 1 or serve as the system 100 directly. As illustrated, the apparatus 400 includes a first obtaining unit 410, a second obtaining unit 420 and a determining unit 430.

The first obtaining unit 410 is configured to obtain a set of tags of virtual machines from the virtual machine system. In some embodiments, the first obtaining unit 410 is configured to obtain information of the tags in the set of tags.

The second obtaining unit 420 is configured to obtain a subset of tags associated with the condition information from the set of tag, in response to receiving condition information from the user. The condition information indicates the condition associated with the operation desired to be performed by the virtual machine.

In some embodiments, the second obtaining unit 420 is further configured to obtain information of the tags in the set of tags. The tag information may include at least one of: a tag category, a tag name and a tag identifier.

In some embodiments, the second obtaining unit 420 further comprises a match determining module (not shown) configured to determine whether the tag is matched with the condition information based on information of the tag and the condition information. In example embodiments, the match determining module is further configured to: in response to determining that the tag is matched with the condition information, determine the tag as one tag in the tag subset.

The determining unit 420 is configured to determine the virtual machine corresponding to at least one tag in the subset of tags to perform the desired operation. In some embodiments, the determining unit 420 further comprises an obtaining module (not shown) configured to obtain the identifier of the virtual machine corresponding to the at least one tag via the application programming interface (API). In some embodiments, the determining unit 420 further comprises a storage module (not shown) configured to store the correspondence relation between the at least one tag and the identifier of the corresponding virtual machine.

The units included in the apparatus 400 may be implemented in various manners, including software, hardware, firmware, or any combination thereof. In one embodiment, one or more modules may be implemented using software and/or firmware, for example, machine-executable instructions stored on the storage medium. In addition to or instead of machine-executable instructions, parts or all of the modules in the apparatus 400 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and so on.

Figure 5:
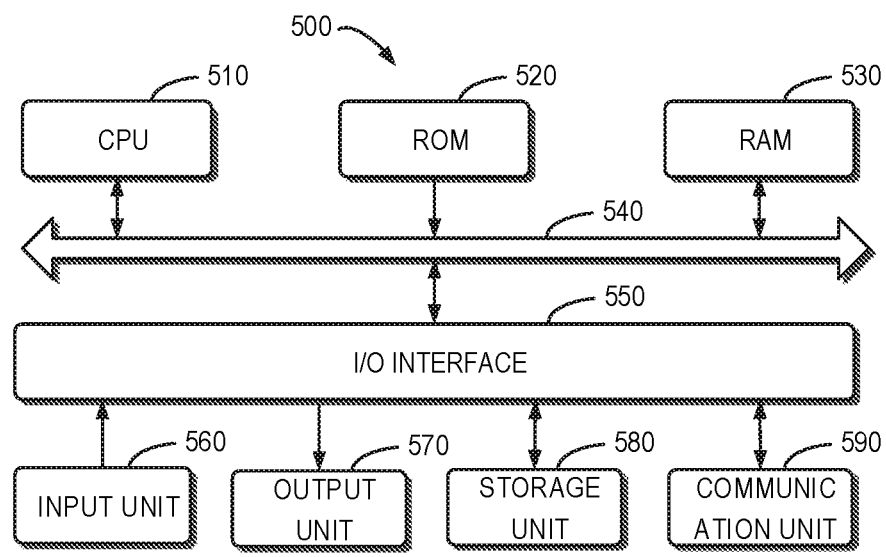
FIG. 5 is a schematic block diagram illustrating a device suitable to implement embodiments of the present disclosure.

FIG. 5 illustrates a schematic block diagram of an electronic device 500 suitable to implement embodiments of the present disclosure. As shown, the device 500 includes a central processing unit (CPU) 510, which can execute various appropriate actions and processing based on the computer program instructions stored in a read-only memory (ROM) 520 or the computer program instructions loaded into a random access memory (RAM) 530 from a storage unit 580. The RAM 530 also stores all kinds of programs and data required by operating the storage device 500. The CPU 510, the ROM 520 and the RAM 530 are connected to each other via a bus 540, to which an input/output (I/O) interface 550 is also connected.

A plurality of components in the device 500 are connected to the I/O interface 550, comprising: an input unit 560, such as keyboard, mouse and the like; an output unit 570, such as various types of displays, loudspeakers and the like; a storage unit 580, such as magnetic disk, optical disk and the like; and a communication unit 590, such as network card, modem, wireless communication transceiver and the like. The communication unit 590 allows the device 500 to exchange information/data with other devices through computer networks such as Internet and/or various telecommunication networks.

Each procedure and processing described above, such as process 200, can be executed by a processing unit 510. For example, in some embodiments, the process 200 can be implemented as computer software programs, which are tangibly included in a machine-readable medium, such as storage unit 580. In some embodiments, the computer program can be partially or completely loaded and/or installed to the device 500 via the ROM 520 and/or the communication unit 590. When the computer program is loaded to the RAM 530 and executed by the CPU 510, one or more steps of the above described process 200 may be implemented. Alternatively, in other embodiments, the CPU 510 may also be configured to implement the above process in any other appropriate manner.

Through the above depiction, it can be seen that the present disclosure is suitable for the following application: used in a virtual machine management system to dynamically group the virtual machines based on identifier information of the target process. Embodiments of the present disclosure improve efficiency of virtual machine configuration and management by obtaining identifier information of the target process; determining a virtual machine running a target process from the plurality of virtual machines based on the identifier information of the target process; and dividing the determined virtual machines into one virtual machine set.

The present disclosure may be a method, an apparatus, a system and/or a computer program product. The computer program product can include a computer-readable storage medium loaded with computer-readable program instructions thereon for executing various aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local region network, a wide region network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flow chart and block diagram in the drawings illustrate system architecture, functions and operations that may be implemented by system, method and computer program product according to multiple implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order dependent on the involved functions. It should also be noted that each block in the block diagram and/or flow chart and combinations of the blocks in the block diagram and/or flow chart can be implemented by a hardware-based system exclusive for executing stipulated functions or actions, or by a combination of dedicated hardware and computer instructions.

Various implementations of the present disclosure have been described above and the above description is only exemplary rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each embodiment, or enable other ordinary skilled in the art to understand implementations of the present disclosure.

We claim:

1. A method for managing virtual machines, comprising:
   obtaining a set of tags used to tag virtual machines, wherein a virtual machine system comprises a plurality of virtual machines, and wherein each virtual machine is associated with at least one of tag in the set of tags;
   in response to receiving condition information from a user and after receiving the set of tags, obtaining, from the set of tags, a subset of tags associated with the condition information, the condition information indicating a condition associated with an operation to be performed by one of the virtual machines;
   obtaining a plurality of identifiers, wherein each of the plurality of identifiers uniquely identifies a virtual machine in a set of virtual machines, wherein each virtual machine in the set of virtual machines is one of the plurality of virtual machines and is associated with at least one tag of the subset of tags;
   storing a mapping between the at least one tag and the plurality of identifiers; and
   determining, based on the stored mapping, a virtual machine to perform the operation, wherein determining the virtual machine comprises selecting an identifier from the plurality of identifiers, wherein the virtual machine is associated with the identifier.

2. The method of claim 1, wherein obtaining the set of tags comprises:
   obtaining the set of tags in the virtual machine system via an application programming interface (API).

3. The method of claim 1, wherein obtaining, from the set of tags, the subset of tags associated with the condition information comprises:
   obtaining information of a tag in the set of tags;
   determining, based on the information of the tag and the condition information, whether the tag matches the condition information; and
   in response to determining that the tag matches the condition information, associating the tag with the subset of tags.

4. The method of claim 3, wherein the information of the tag comprises at least one selected from a group consisting of:
   a tag category,
   a tag name, and
   a tag identifier.

5. A device for managing virtual machines, comprising:
   at least one processing unit; and
   at least one memory coupled to the at least one processing unit and storing machine-executable instructions, the instructions, when implemented by the at least one processing unit, causing the device to perform a method, the method comprising:
      obtaining a set of tags used to tag virtual machines, wherein a virtual machine system comprises a plurality of virtual machines, and wherein each virtual machine is associated with at least one of tag in the set of tags in a virtual machine system;
      in response to receiving condition information from a user and after receiving the set of tags, obtaining, from the set of tags, a subset of tags associated with the condition information, the condition information indicating a condition associated with an operation to be performed by one of the virtual machines;
      obtaining a plurality of identifiers, wherein each of the plurality of identifiers uniquely identifies a virtual machine in a set of virtual machines, wherein each virtual machine in the set of virtual machines is one of the plurality of virtual machines and is associated with at least one tag of the subset of tag;
      storing a mapping between the at least one tag and the plurality of identifiers; and
      determining, based on the stored mapping, a virtual machine corresponding to at least one tag in the subset of tags to perform the operation, wherein determining the virtual machine comprises selecting an identifier from the plurality of identifiers, wherein the virtual machine is associated with the identifier.

6. The device of claim 5, wherein obtaining the set of tags comprises:
   obtaining the set of tags in the virtual machine system via an application programming interface (API).

7. The device of claim 5, wherein obtaining, from the set of tags, the subset of tags associated with the condition information comprises:
   obtaining information of a tag in the set of tags;
   determining, based on the information of the tag and the condition information, whether the tag matches the condition information; and
   in response to determining that the tag matches the condition information, associating the tag with the subset of tags.

8. The device of claim 7, wherein information of the tag comprises at least one selected from a group consisting of:
   a tag category,
   a tag name, and
   a tag identifier.

9. A non-transitory computer readable storage medium having computer readable program instructions stored thereon, the computer readable program instructions, when executed by a processing unit, causing the processing unit to implement a method, the method comprising:
 obtaining a set of tags used to tag virtual machines, wherein a virtual machine system comprises a plurality of virtual machines, and wherein each virtual machine is associated with at least one of tag in the set of tags;
 in response to receiving condition information from a user and after receiving the set of tags, obtaining, from the set of tags, a subset of tags associated with the condition information, the condition information indicating a condition associated with an operation to be performed by one of the virtual machines;
 obtaining a plurality of identifiers, wherein each of the plurality of identifiers uniquely identifies a virtual machine in a set of virtual machines, wherein each virtual machine in the set of virtual machines is one of the plurality of virtual machines and is associated with at least one tag of the subset of tag;
 storing a mapping between the at least one tag and the plurality of identifiers; and
 determining, based on the stored mapping, a virtual machine to perform the operation, wherein determining the virtual machine comprises selecting an identifier from the plurality of identifiers, wherein the virtual machine is associated with the identifier.

10. The non-transitory computer readable storage medium of claim 9, wherein obtaining the set of tags comprises:
 obtaining the set of tags in the virtual machine system via an application programming interface (API).

11. The non-transitory computer readable storage medium of claim 9, wherein obtaining, from the set of tags, the subset of tags associated with the condition information comprises:
 obtaining information of tags in the set of tags;
 determining, based on the information of the tag and the condition information, whether the tag matches the condition information; and
 in response to determining that the tag matches the condition information, associating the tag with the subset of tags.

12. The non-transitory computer readable storage medium of claim 11, wherein information of the tag comprises at least one selected from a group consisting of:
 a tag category,
 a tag name, and
 a tag identifier.

* * * * *